United States Patent

[11] 3,556,500

| [72] | Inventors | Leonard Fritz<br>Romulus;<br>Melvin Wallace, Birmingham; John G.<br>Seguin, New Boston, Mich. |
|---|---|---|
| [21] | Appl. No. | 776,716 |
| [22] | Filed | Nov. 18, 1968 |
| [45] | Patented | Jan. 19, 1971 |
| [73] | Assignee | Huron Valley Steel Corporation<br>Belleville, Mich. |

[54] METHOD AND APPARATUS FOR SEPARATING METALS FROM COMINGLED SCRAP METAL
4 Claims, 4 Drawing Figs.

[52] U.S. Cl. .................................................. 266/33, 75/63
[51] Int. Cl. .................................................. C22f 1/00
[50] Field of Search .......................................... 266/34, 37, 33scrap; 209/11, 182; 210/65, 69, 73; 23/280; 214/21; 75/63, 64

[56] References Cited
UNITED STATES PATENTS

| 1,938,239 | 12/1933 | White | 23/280 |
|---|---|---|---|
| 2,041,811 | 5/1936 | Betterton et al. | 75/63 |
| 2,041,844 | 5/1936 | Linder | 75/63 |
| 2,154,673 | 4/1939 | Fleck et al. | 75/63 |
| 2,703,230 | 3/1955 | Mansbach | 266/37 |
| 2,943,930 | 7/1960 | Proler | 75/63 |
| 3,323,908 | 6/1967 | Tezuka | 75/63 |
| 3,484,231 | 12/1969 | Uzdavines | 75/63 |

*Primary Examiner*—Gerald A. Dost
*Attorney*—Cullen, Sloman & Cantor

ABSTRACT: Separating a scrap nonferrous and ferrous metal mixture into its constituent components by breaking it into approximately equal size pieces and passing it through a furnace having heating zones, each of a temperature to melt one component, to thereby drain the molten components one at a time, with the ferrous metals remaining as the unmelted residue at the discharge end of the furnace, and using a long, tilted and vibrated furnace tray as the means for supporting, agitating and conveying the metal pieces.

PATENTED JAN 19 1971  3,556,500

INVENTORS
LEONARD FRITZ
MELVIN WALLACE
JOHN G. SEGUIN

BY Cullen, Sloman, & Cantor
ATTORNEYS

METHOD AND APPARATUS FOR SEPARATING METALS FROM COMINGLED SCRAP METAL

BACKGROUND OF INVENTION

Scrap metal such as scrap automobiles, motors, machinery parts and the like usually comprise a number of metal components all comingled together with the scrap. For example, a scrap automobile, once its upholstery, glass and other non-metallic parts have been removed comprise a number of parts made of aluminum, copper, zinc, ferrous materials, etc. Such comingled scrap metal is worth very little and has only few applications.

However, separating the scrap metal into the component metallic parts, produces a variety of ferrous and nonferrous metals each of which have considerably more value than the comingled metals together. In the past, attempts have been made to separate the scrap manually, such as by manually picking out of a scrap automobile, the cast iron engine block, the aluminum head, zinc attachments, aluminum trim, copper wiring, etc. However, this method of separating the various metal components is relatively expensive because of the high amount of labor required and particularly is difficult to perform on a large scale production basis, handling large tonnage of scrap daily.

Thus, this invention is concerned with a method and an apparatus for separating the various metal constituents of scrap metals rapidly, economically and without using manual labor to any considerable extent.

SUMMARY OF INVENTION

In summary, this invention contemplates breaking up the scrap metal into approximately equal size pieces and then passing these pieces through a horizontally elongated furnace where they are melted out, component by component, one at a time, with a discharge residue of ferrous metals which were unmelted so that the nonferrous metals may be handled separately from the ferrous metals and from each other.

Hence, an object of this invention is to provide a method for processing comingled scrap metals which essentially comprises breaking up the metal into relatively small-size uniform pieces and passing them through a heated furnace having successively hotter melting zones so as to melt out the nonferrous components one by one in their respective melting zones and discharging from the end of the furnace the higher melting ferrous metals.

Another object of this invention is to provide a suitable furnace for handling scrap metal pieces, in the form of an elongated tunnel comprising combustion heaters at various predetermined melting zones, and conveying the scrap metal upon a single, elongated tray slightly tipped relative to the horizontal and vibrated so that the metal pieces are agitated and conveyed along the tray from one end of the furnace to the other and so that the various nonferrous components may be melted out of the pieces, one by one, in the various melting zones.

These and other and advantages of this invention will become apparent upon reading the following description of which the attached drawings form a part.

DETAILED DESCRIPTION

Figure 1:
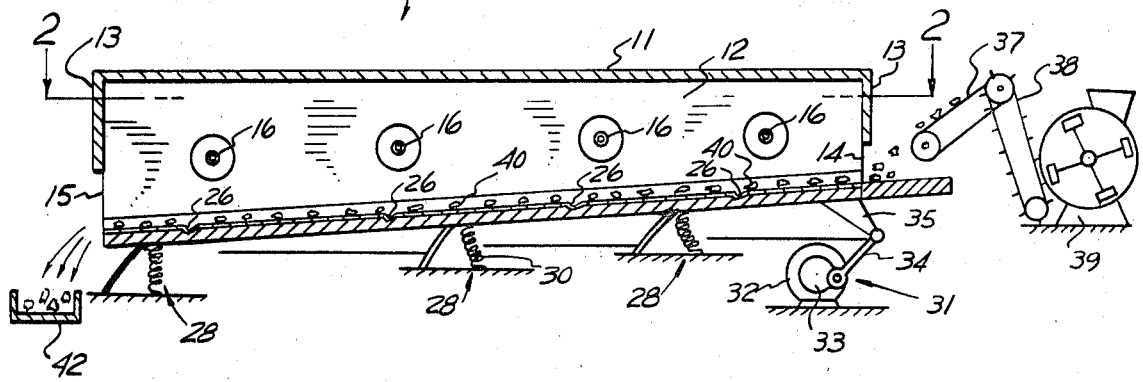
FIG. 1 is an elevational cross-sectional view, partly schematic, showing the furnace apparatus herein.
Figure 2:
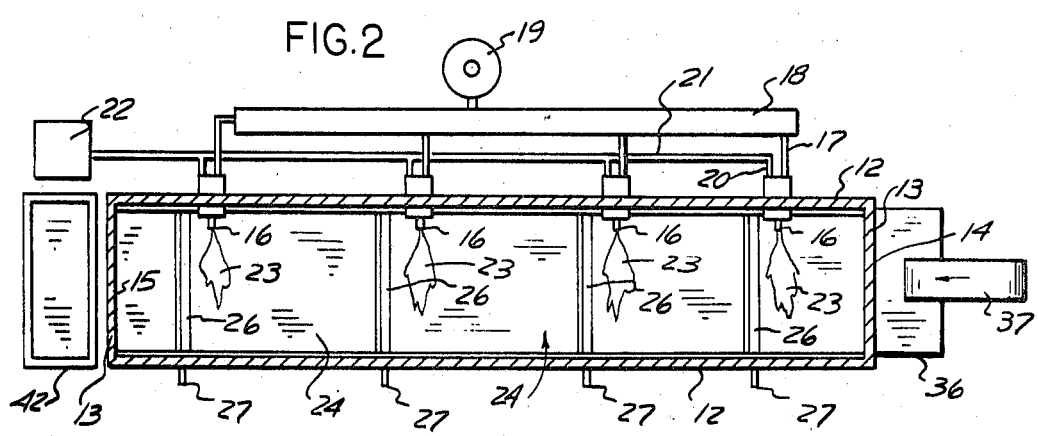
FIG. 2 is a cross-sectional, plan view taken in the direction of arrows 2–2 of FIG. 1.
Figure 3:
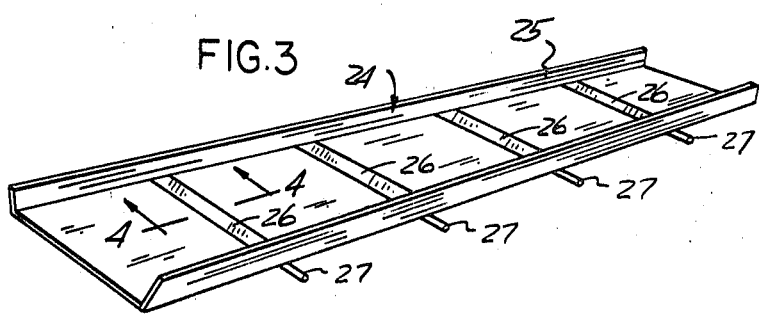
FIG. 3 is an enlarged, perspective view of the furnace tray, per se.
Figure 4:
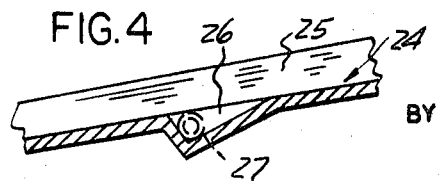
FIG. 4 is an enlarged elevational view of a portion of the tray taken in the direction of arrows 4–4 of FIG. 3.

The apparatus includes a horizontally elongated, tunnellike furnace 10 having a top 11, sidewalls 12 and partial end walls 13 which provide an entrance or feed end 14 and a discharge end 15. Within the furnace, secured to one of its walls, are fuel-air combustion heater nozzles 16, each defining a heating or melting zone of a predetermined temperature. The heaters are formed so that the one nearest to the entrance or feed end of the furnace is operated at a lower temperature than the next heater, with each successive heater being hotter than the preceding one, so as to melt out, one by one, the nonferrous metal components of the scrap metal in accordance with their respective melting temperatures.

The heaters each have a pipe 17 connected to an airline 18 in turn connected to an air compressor for supplying compressed air or oxygen in the required amount. Also, each heater is provided with a fuel pipe 20 connected to a fuel line 21, in turn connected to a fuel reservoir or tank 22. The mixture of the fuel, such as oil or natural gas, provides a flame 23.

The furnace is, for all practical purposes, of a closed atmosphere type, that is, little outside air enters so that the fuel-air mixture at each heater may be controlled to avoid excess oxygen within the furnace and thereby avoid a possibility of oxidizing the scrap metal and more importantly, reducing exothermic reactions of various scrap metals which might tend to overheat the metal at any particular point within the furnace.

The floor of the furnace consists of a single, elongated tray 24 which may be formed of sheet metal with a ceramic coating so as to resist heat and to be impervious to the molten metal. The tray is provided with edge walls 25 and, at each melting zone within the furnace, a V-shaped grove 26 connected to a discharge pipe or opening 27.

The tray is supported upon a number of movable supports 28 which permit the tray to vibrate and move slightly within the furnace. As illustrated, each support comprises a series of leaf springs 29 with opposing coil springs 30, although other suitable constructions may be substituted.

A vibrator 31 vibrates the tray at a suitable frequency to agitate the metal pieces thereon. Preferably, the tray is tilted to the horizontal to a slight degree such as approximately 2° so that combined with the vibration, pieces of metal upon the tray tend to move from the entrance or feed end of the furnace out to the discharge end of the furnace.

While any suitable vibrator may be used, one form illustrated consists of a motor 32 rotating an eccentric disc 33 to which is connected a crank 34, in turn connected to an arm 35 fastened to the bottom of the tray. Thus, the tray is vibrated in accordance with the motor r.p.m. which may be varied depending upon the size of the scrap pieces.

At the entrance end of the furnace, an apron or platform 36 is arranged to receive the discharge from conveyors 37 and 38 which may be scrap passed through a hammermill 39. From the apron the pieces of scrap 40 slide upon the tray 24.

Since scrap metal comes in a variety of sizes and shapes, it is desired here to break up the scrap into relatively uniformly size pieces of relatively small size. The size of the pieces is not critical but the closer they are to uniformity, the better the separation within the furnace. Hence, any suitable commercially available hammermill or shredder will function here to break up the scrap metal into the substantially uniform size pieces.

At the discharge end of the furnace, suitable tote boxes 42 or conveyors may be arranged to remove from the area that portion of the scrap not melted within the furnace.

OPERATION

In operation, the scrap metal, such as automobile scrap, machinery scrap parts, etc., are shredded or broken up in the hammermill 39 or other available shredder and then the pieces, preferably uniform in size, are conveyor carried to the entrance apron 36. Here, the pieces are fed into the tray and are agitated and moved along the tray from the entrance towards the discharge end of the furnace.

As the scrap passes into the first heating zone, that is, to the area of the first combustion flame heater, the lowest melting point material is removed. For example, if the scrap contains lead, at this point the lead would become molten and drain into the trough or grove 26 in the tray and then flow out through the pipe 27 where it may be cast into pig or ingot shape or otherwise handled separately from the remaining scrap.

At the next heating zone, the next highest melting point material may be removed, so that step by step as the metal pieces pass through the furnace, the nonferrous components are melted and removed, one by one.

At the discharge end of the furnace, since the temperature of the furnace is maintained below the melting point for ferrous materials, the ferrous metals are discharged as a residue where they may be separately processed.

It can be seen that where the scrap is comprised of a number of metals, such as lead, zinc, aluminum, copper, brass as well as ferrous metals, that by separating these, the degree of purity of each of the components is approximately equal to its initial purity when first formed into the part and each component now has considerably greater value as a separate component metal than the comingled scrap metal had.

Since the process is intended to be operated continuously, little manual labor is required other than for supervision of the feed and discharge of the molten materials as well as residue, and the net result is the conversion of practically useless scrap metals into valuable metal raw material capable of being reused for making new industrial parts.

We claim:

1. Apparatus for continuously separating relatively low melting point nonferrous metal components such as lead, zinc, copper, brass, aluminum and the like from comingled scrap metal containing higher melting point ferrous metal components, comprising:

a horizontally elongated, tunnellike furnace having a feed end and a discharge end and having melting zones spaced along its length;

a continuous imperforate channel-shaped tray extending the length of the furnace and arranged to receive and convey pieces of such scrap metal through the furnace, and arranged with its feed end above its discharge end; with longitudinally spaced molten metal cross drain grooves formed in the tray bottom to define the melting zones; and a side drain opening at each groove;

a fuel-air combustion heater at each melting zone for providing a temperature in that zone for melting one of the components, with each successive zone from the feed end to the discharge end being hotter than the preceding zone so as to melt a successively higher nonferrous metal component, the furnace being otherwise substantially closed to atmospheric air and oxygen;

The temperature of the last zone being below the melting point of the ferrous metal so that the ferrous metal components are discharged from the furnace unmelted;

whereby the nonferrous metals are separately drained sidewise from their respective melting zones of the tray in molten condition for separating them from each other and from the ferrous metals.

2. Apparatus as defined in claim 1, and said tray having a molten metal and furnace heat impervious bottom, except for the respective drains, and being tilted at a slight angle to the horizontal from the feed end to the discharge end of the furnace.

3. Apparatus as defined in claim 2, and including vibrating means for continuously vibrating the tray for thereby vibrating, agitating and moving the pieces along the length of the tray.

4. Apparatus as defined in claim 3, and including a grinding means for shredding the scrap metal into approximately equal size pieces before being placed in the furnace; and means for conveying said pieces into the furnace upon the tray.